Nov. 19, 1935.   C. N. MITCHELL   2,021,194
LINK
Original Filed Aug. 22, 1930
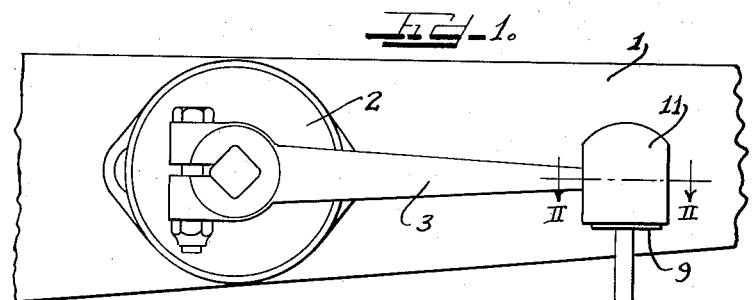
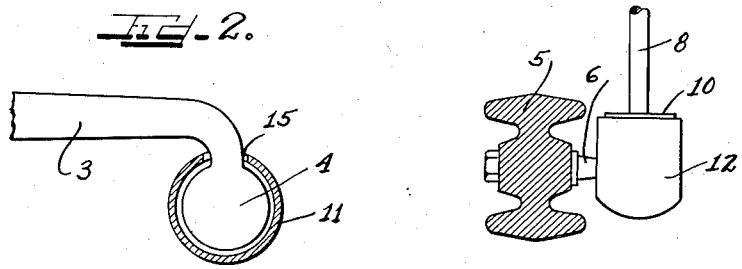
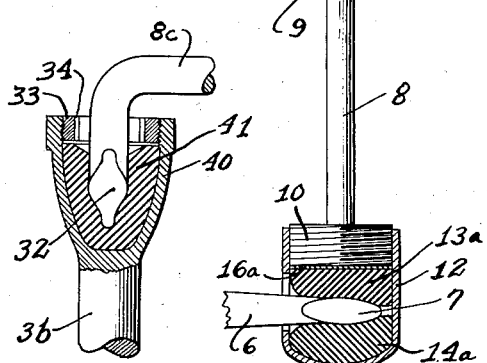
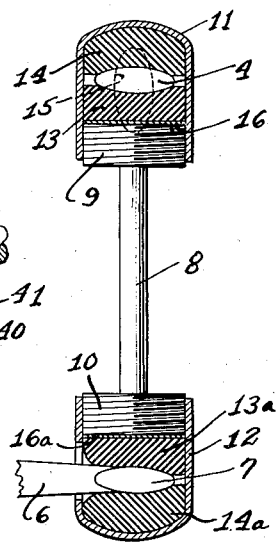
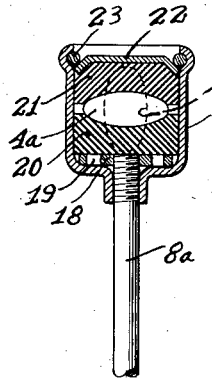
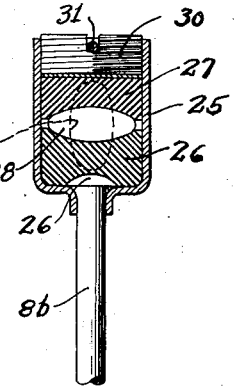
Inventor
Courtney N. Mitchell.
by Charles W. Hills
Attys.

Patented Nov. 19, 1935

2,021,194

UNITED STATES PATENT OFFICE 2,021,194

LINK

Courtney N. Mitchell, Strongsville, Ohio, assignor to Houde Engineering Corporation, Buffalo, N. Y., a corporation of New York Original application August 22, 1930, renewed December 15, 1932, Serial No. 477,035. Divided and this application September 18, 1935, Serial No. 41,131

4 Claims. (Cl. 287—85)

This invention relates to connecting links which are particularly adapted for use with a vehicle shock absorber.

This application is a division of my copending application entitled "Connecting rod for shock absorbers" Serial No. 477,035, originally filed August 22, 1930, and renewed December 15, 1932.

It is an object of this invention to provide a connecting link provided at its opposite ends with a housing or casing in which is secured one or more blocks of elastic material, such as rubber, each block being shaped to define an opening or socket, which is oval, spheroidal, or elliptical in shape and adapted to receive therein the similarly shaped end of a stud or arm, the housings each being provided with an elongated opening to facilitate the insertion of the end of the stud or arm therein.

Another object of this invention is to provide a connecting link for connecting the arm of a shock absorber with a stud carried by an axle in such a manner as to provide a yielding connection between the stud and the arm which will permit a slight relative movement therebetween.

A further object of this invention is to provide a connecting rod which is noiseless and requires no lubrication.

A specific object of this invention is to provide a connecting link having a housing with a resilient bushing seated therein adapted to receive a flattened stud head of a stud by insertion of the stud head through an opening provided in the housing and rotation of the stud head to be seated in the rubber bushing and thus be locked in the housing.

Other and further objects of this invention will appear from the following detailed description of the annexed sheet of drawing which discloses preferred embodiments of the invention.

On the drawing:

Figure 1 is a fragmentary view, partly in cross section and partly in side elevation disclosing my improved connecting link connected with the shock absorber of a vehicle.

Figure 2 is a horizontal cross sectional view taken substantially on the line II—II of Figure 1.

Figure 3 is a vertical sectional view of the connecting link shown in Figures 1 and 2, with parts in elevation.

Figure 4 is a fragmentary vertical cross sectional view disclosing a modified form of connecting link according to this invention.

Figure 5 is a view similar to Figure 4 disclosing another modification of a link according to this invention.

Figure 6 is a side elevational view, with parts shown in vertical cross section, of another modification of link according to this invention.

As shown on the drawing:

The reference character 1 designates a portion of the frame of an automotive vehicle to which is secured a shock absorber 2 of the double acting type, the details of construction of which form no part of this invention. The shock absorber 2 is provided with an arm 3 which extends outwardly therefrom and has its outer end bent at an angle thereto as is shown most clearly in Figure 2. The outer end 4 of the arm 3 is oval or elliptical in shape as shown most clearly in Figures 2 and 3.

The reference character 5 designates the axle of an automotive vehicle to which is secured a stud 6 in any suitable manner. The outer end of the stud 6 is enlarged as shown at 7 in Figure 3 and is substantially the same shape as the outer end 4 of the arm 3.

The connecting link consists essentially of a rod 8, the opposite ends of which are slightly enlarged and exteriorly threaded as shown at 9 and 10 in Figure 3. Threadedly secured over each of the threaded portions 9 and 10 of the rod 8 are housings or casings 11 and 12.

Arranged within each of the housings 11 and 12 are rubber blocks 13, 14 and 13a, 14a, respectively, which are shaped to define a socket or recess which is oval or elliptical and adapted to receive therein the similarly shaped end portions 4 and 7 of the arm 3 and stud 6, respectively. The housings 11 and 12 are each provided in one side thereof with elongated openings 15 which are sufficiently long to permit the insertion of the stud and arm heads 7 and 4 therein.

As shown, the rubber blocks define a preformed recess in the housing having its major axis at an angle to the major axis of the elongated openings 15, preferably in alignment with the short axis of the openings 15.

Arranged within each of the housings 11 and 12 are disks 16 and 16a which are disposed between the rubber blocks and the ends of the rod 8 to provide a bearing for the rubber blocks 13 and 13a, respectively.

Due to the fact that the end portion 4 of the arm 3 and end portion 7 of the stud 6 are oval or elliptical in shape and fit within the similarly shaped sockets provided in the rubber blocks, it will be seen that upon relative movement between the vehicle axle and frame, the end portions of the stud and arm will tend to turn within the sockets. However, since the rubber blocks fit closely around these end portions, the blocks resist the turning movement and relative movement between the stud heads and the housing is permitted primarily by interparticle flow of the rubber bushing. The blocks of rubber or other suitable resilient lining material for seating the stud and arm ends therefore permit a slight movement of the ends, thus providing a resilient but operative connection between the arm and stud which provides an additional checking action for the movements of the axle and the frame of an automotive vehicle.

In securing the connecting link to the stud 6, the lower rubber block 14a is first placed within the housing 12 and the end 7 of the stud 6 is turned about 90 degrees from the position shown in Figure 3 and inserted through the elongated opening 15 provided in the housing. The rubber block 14a is compressed by a suitable tool so as to permit insertion of the stud therein. The end of the stud is then rotated back about 90 degrees to be seated in the recess of the rubber block 14a. The other rubber block 12 is then placed in the housing over the end of the stud and the portion 10 of the rod 8 is threaded in the housing to slightly compress the blocks and seat the stud head in the sockets provided by the rubber blocks. The end of the stud is thus locked in the housing since it cannot be removed through the opening 15 unless it is rotated about 90 degrees. The end 4 of the arm 3 is seated in the housing 11 in the same manner. After the connecting link has been secured to the stud and arm, adjustment can be made by turning the rod 6 to place the rubber blocks under the desired amount of compression.

In Figure 4 there is disclosed a slightly modified form of my invention in which the connecting link consists of a rod 8a, the upper end of which is exteriorly threaded and over which is secured a housing 17 which is held in place by means of a nut 18 threadedly secured over the threaded end portion of the rod. The nut 18 is provided with tool engaging portions 19 whereby the same may be tightened. Arranged within the casing or housing 17 are blocks of rubber 20 and 21 which are substantially identical with the blocks of rubber 13 and 14 used in connection with the form of the invention shown in Figures 1 to 3 inclusive. However, in this case, the upper end of the casing is open and is closed by means of a cap or cover 22 which is secured in place by a split ring 23 fitting within a groove provided in the upper portion of the housing 17. The opposite end of the rod 8a is of similar construction. The housing 17 has an elongated opening 24 giving entrance thereto and the end 4a of the arm 3 is inserted in the housing in the manner described above in connection with Figures 1 to 3.

In Figure 5 there is disclosed another modification of my invention in which the connecting link consists of a rod 8b over the upper end of which is secured a casing or housing 25. The upper end of the rod 8b is flattened or headed as at 26 to secure the casing or housing 25 thereto. The upper end of the housing 25 is interiorly threaded.

Arranged within the housing 25 are blocks of rubber 26 and 27 which are shaped to provide an oval or elliptical socket adapted to receive a similarly shaped end portion 28 of the arm 3 or stud 6. The housing 25 is also provided at one side thereof with an elongated opening 29 having its major axis at an angle to the major axis of the socket defined by the rubber blocks. The socket or recess is preferably in alignment with the short axis of the opening 29 to facilitate insertion of the end portion 28.

The upper end of the casing or housing 25 is closed by means of a cap or cover 30 which is threadedly secured therein and locked in adjusted position by means of a cotter pin 31. The opposite end of the rod 8b may be of similar construction.

In Figure 6 there is disclosed still another modification of my invention in which the shock absorber arm 3b is provided with an enlarged portion defining a housing or casing 40, the outer end of which is open and interiorly threaded. Fitted within the enlarged portion 40 is a block of rubber 41 which has an opening therein shaped to define an oval socket or recess which is adapted to receive the similarly shaped projecting end portion 32 of a connecting rod 8c. Threadedly secured within the end of the housing 40 is an annular ring or nut 33 which surrounds the end portion of the rod 8c and secures the rubber block 41 in place. The ring or nut 33 is provided with tool engaging portions 34 by means of which the same may be turned to adjust the pressure upon the rubber block. The opening in the nut 33 is of such size as to permit some relative movement between the shock absorber arm 3b and the connecting rod 8c. The connection at the other end of the rod 8c is of similar construction.

In all forms of the invention disclosed, the end portions of the arm and stud are flattened in shape and adapted to fit within a similarly shaped opening provided in the housings. In each case, this end portion is surrounded by one or more blocks of rubber or other suitable resilient material which will permit a slight movement of the end portions of the stud or arm therein, thus providing a somewhat resilient but operative connection between the arm and stud.

The housings or casings are provided with an elongated opening which is somewhat oval or elliptical in shape and has its major axis disposed substantially parallel with the axis of the rod, thus providing a very simple and effective means for securing the connecting link in place.

I am aware that many changes may be made and numerous details of construction may be varied through a wide range without departing from the principles of this invention and, I, therefore, do not purpose limiting the patent granted hereon otherwise than necessitated by the prior art.

I claim as my invention:

1. In a link, a housing having an elongated opening giving entrance thereto, a resilient bushing in said housing defining a preformed narrow cavity having the long axis thereof at an angle to the long axis of the said elongated opening of the housing, a stud member having a flattened head seated in said cavity in tight engagement with the bushing walls defining the cavity and entirely surrounded by the bushing, whereby relative movement between the stud and housing is permitted by interparticle flow of the resilient bushing, said flattened stud head having the maximum diameter thereof slightly less than the longer axis of the elongated opening of the housing but greater than the short axis of said opening so that the stud head is locked in the housing when seated in the bushing cavity.

2. In a link assembly, a housing having an elongated opening giving entrance thereto, a pair of resilient rubber blocks in said housing defining together a resilient bushing with a preformed elongated cavity therein in alinement with the opening in the housing but having the long axis thereof at an angle to the long axis of the opening, a stud having a flattened head seated in said cavity with said blocks substantially surrounding the entire stud head, the long axis of said opening being greater than the width of said stud head to permit insertion of the stud head into the housing, said width of the stud head being greater than the short axis of the opening in the housing, whereby the stud head is locked into the housing after being seated in the bushing cavity and movement between the stud and housing is permitted by interparticle flow of the rubber blocks.

3. In a link assembly, a housing having a free open end and an elongated side opening, a rubber bushing in said housing having a preformed elongated cavity therein in alinement with said side opening, the long axis of the cavity being at an angle to the long axis of the side opening, a stud having a flattened head seated in said bushing cavity and substantially entirely surrounded by said bushing, the long axis of said side opening being greater than the width of said stud head but the width of said stud head being greater than the short axis of said side opening whereby the stud is locked in the housing when seated in the cavity of the bushing and relative movement between the stud and housing is permitted by interparticle flow of the rubber bushing and a closure member for the free open end of the housing to hold the bushing therein.

4. A connecting rod having a housing at one end thereof, said housing having an elongated opening giving entrance thereto, a rubber bushing in said housing having a preformed narrow slot located therein adjacent the housing opening and transversely thereof, and a stud member having a flattened head seated in said slot and substantially surrounded by said bushing, the diameter of said stud head being slightly less than the longer axis of said housing opening but greater than the short axis of said opening whereby said stud head may be inserted through said opening and rotated 90° to be seated in the slot and locked in the housing, and relative movement between the stud and housing is permitted by interparticle flow of the rubber bushing.

COURTNEY N. MITCHELL.